US007590692B2

(12) United States Patent
Van Dyke et al.

(10) Patent No.: US 7,590,692 B2
(45) Date of Patent: Sep. 15, 2009

(54) CONFERENCING ARCHITECTURE EMPLOYING MEDIA SERVERS AND ENHANCED SESSION INITIATION PROTOCOL

(75) Inventors: John Jeffrey Van Dyke, Concord, MA (US); Andy Spitzer, North Andover, MA (US)

(73) Assignee: Dialogic Corporation, Montreal, Quebec (CA)

(*) Notice: Subject to any disclaimer, the term of this patent is extended or adjusted under 35 U.S.C. 154(b) by 679 days.

(21) Appl. No.: 10/191,788

(22) Filed: Jul. 9, 2002

(65) Prior Publication Data

US 2003/0145054 A1 Jul. 31, 2003

Related U.S. Application Data

(60) Provisional application No. 60/303,837, filed on Jul. 9, 2001.

(51) Int. Cl.
*G06F 15/16* (2006.01)
(52) U.S. Cl. .................. 709/206; 709/205; 709/207
(58) Field of Classification Search ............. 709/204, 709/205, 206, 207
See application file for complete search history.

(56) References Cited

U.S. PATENT DOCUMENTS

| | | | | |
|---|---|---|---|---|
| 5,557,725 | A | 9/1996 | Ansberry et al. ............. 715/755 |
| 6,011,782 | A | 1/2000 | DeSimone et al. ........... 370/260 |
| 6,025,870 | A | 2/2000 | Hardy ........................ 348/14.1 |
| 6,167,432 | A * | 12/2000 | Jiang ............................ 709/204 |
| 6,202,084 | B1 | 3/2001 | Kumar et al. ................ 709/204 |
| 6,332,153 | B1 | 12/2001 | Cohen ......................... 709/204 |
| 6,343,321 | B2 | 1/2002 | Patki et al. ................... 709/227 |
| 6,366,577 | B1 | 4/2002 | Donovan ..................... 370/352 |
| 6,381,606 | B1 | 4/2002 | Carpenter et al. ........... 707/100 |
| 6,501,740 | B1 * | 12/2002 | Sun et al. ..................... 370/261 |
| 6,668,288 | B1 * | 12/2003 | Midwinter et al. ............ 710/29 |
| 6,701,366 | B1 * | 3/2004 | Kallas et al. ................. 709/227 |
| 6,771,639 | B1 * | 8/2004 | Holden ........................ 370/352 |
| 6,785,246 | B2 * | 8/2004 | Foti ............................ 370/261 |
| 6,901,448 | B2 * | 5/2005 | Zhu et al. .................... 709/228 |
| 6,909,778 | B2 * | 6/2005 | Wengrovitz ............ 379/201.01 |
| 7,024,461 | B1 * | 4/2006 | Janning et al. ............... 709/207 |
| 7,127,400 | B2 * | 10/2006 | Koch ........................ 704/270.1 |
| 7,221,663 | B2 * | 5/2007 | Rodman et al. ............. 370/329 |
| 2002/0103864 | A1 * | 8/2002 | Rodman et al. ............. 709/204 |
| 2002/0118808 | A1 * | 8/2002 | Kelleher et al. ........ 379/202.01 |
| 2002/0126626 | A1 * | 9/2002 | Singh et al. ................. 370/260 |

(Continued)

*Primary Examiner*—Michael Won
(74) *Attorney, Agent, or Firm*—Weingarten, Schurgin, Gagnebin & Lebovici LLP (57) ABSTRACT

A conferencing system that can access advanced conferencing features while following essentially the same call flow as conventional conferencing systems. The conferencing system includes a computer network, and at least one conferencing application server, at least one media server, and at least one user agent connected to the network. The conferencing application server establishes and manages multimedia conferences by engaging in Session Initiation Protocol (SIP) signaling with the user agents and the media server. Once the conference is established, the media server generates multimedia data such as audio data and conveys the data to the conference participants. In order to access advanced conferencing features, the conferencing system employs an enhanced SIP signaling technique including a conferencing Application Programming Interface (API) implemented by incorporating Extensible Mark-up Language (XML) messages in the bodies of respective SIP request/response messages. The XML messages are incorporated in the SIP request/response message bodies to convey conference specific commands and/or parameters that cannot be easily described via the Session Description Protocol (SDP).

29 Claims, 3 Drawing Sheets

U.S. PATENT DOCUMENTS

2002/0133611 A1* 9/2002 Gorsuch et al. ............ 709/231
2002/0198941 A1* 12/2002 Gavrilescu et al. ......... 709/205
2003/0051037 A1* 3/2003 Sundaram et al. .......... 709/227
2003/0167418 A1* 9/2003 Zhu et al. ..................... 714/4
2005/0086556 A1* 4/2005 Zhu et al. ..................... 714/4

* cited by examiner

CONFERENCING ARCHITECTURE EMPLOYING MEDIA SERVERS AND ENHANCED SESSION INITIATION PROTOCOL

CROSS REFERENCE TO RELATED APPLICATIONS

This application claims priority of U.S. Provisional Patent Application No. 60/303,837 filed Jul. 9, 2001 entitled CONFERENCING ARCHITECTURE EMPLOYING MEDIA SERVERS AND ENHANCED SESSION INITIATION PROTOCOL.

STATEMENT REGARDING FEDERALLY SPONSORED RESEARCH OR DEVELOPMENT

N/A

BACKGROUND OF THE INVENTION

The present invention relates generally to conferencing systems, and more specifically to techniques for accessing enhanced conferencing capabilities.

Conferencing systems are known that employ the Session Initiation Protocol (SIP) to establish and manage multimedia sessions (also known as "conferences") over computer networks. For example, a conference having zero or more conference participants may be established over a network by a conferencing application server, which communicates with each conference participant and at least one media server on the network using SIP call control signaling. In the event a prospective conference participant wishes to join the conference, the prospective participant sends a SIP request message to the conferencing application server. After receiving the SIP request message, the conferencing application server sends a corresponding SIP request message to at least one media server assigned to the conference.

In the event the conference Universal Resource Identifier (URI) exists on the media server, the media server sends a SIP 200 OK message to the conferencing application server to indicate that the prospective conference participant has been successfully joined to the conference. If the conference URI does not exist on the media server, then the desired conference is created before the media server sends the SIP 200 OK message. The conferencing application server then sends a corresponding SIP 200 OK message to the conference participant to indicate the participant's success in joining the conference. Next, the conference participant sends a SIP ACK message to the conferencing application server to acknowledge its receipt of the SIP 200 OK message, and the conferencing application server sends a corresponding SIP ACK message to the media server. Because the prospective conference participant has successfully joined the conference, a multimedia session is established during which multimedia data such as audio data is generated and conveyed between the media server and the conference participant.

In the event the conference participant wishes to be removed from the conference, the participant sends a SIP BYE request message to the conferencing application server, which in turn conveys the SIP BYE request to the media server. Next, the media server sends a SIP 200 OK message to the conferencing application server, which in turn conveys the SIP 200 OK message to the conference participant, thereby indicating that the participant has been successfully removed from the Conference. In this way, the conferencing application server can both create a multimedia conference and control prospective conference participants' access to the conference.

Although the above-described SIP call control signaling technique may be employed to establish and manage multimedia conferences, the technique has drawbacks in that it is generally not amenable to establishing and managing conferences that provide advanced conferencing features such as notification of conference events (e.g., the identification of conference participants whose voices are mixed into the audio output of the conference) or packet mixing for determining the scope of multimedia data delivery within a conference. The above-described technique also provides no mechanism for detecting and reporting media events such as DTMF/MF digits input by conference participants. Such events are commonly used to invoke advanced conferencing features. This is because conventional SIP call control signaling techniques employing SIP INVITE/BYE request messages typically do not provide interfaces that can easily access such advanced conferencing features.

It would therefore be desirable to have a conferencing system for establishing and managing multimedia conferences over computer networks. Such a conferencing system would employ enhanced call control signaling techniques to provide a conferencing application server/media server interface capable of accessing advanced conferencing features It would also be desirable to have a conferencing system that can access advanced conferencing features while following essentially the same call flow as conventional conferencing systems.

BRIEF SUMMARY OF THE INVENTION

In accordance with the present invention, a conferencing system is provided that can access advanced conferencing features while following essentially the same call flow as conventional conferencing systems. Benefits of the presently disclosed conferencing system are achieved by employing a conferencing application programming interface based on the Extensible Mark-up Language (XML) in conjunction with Session Initiation Protocol (SIP) call control signaling to create full-featured conferencing applications.

In one embodiment, the conferencing system comprises a computer network including a signaling plane and a media plane, and at least one conferencing application server, at least one media server, and at least one user agent communicably connected to the network. The conferencing application server is configured to establish and manage at least one multimedia conference by engaging in SIP signaling with one or more of the user agents wishing to participate in the conference and the media server in the signaling plane of the network. Once the multimedia conference is established, the media server generates multimedia data such as audio data and conveys the data to the conference participants in the media plane of the network.

In the presently disclosed embodiment, the conferencing system employs a SIP INVITE signaling method to create the multimedia conference and subsequently join prospective participants to the conference. The conferencing system also employs a SIP BYE signaling method to remove participants from the conference and/or terminate the conference. In order to access advanced conferencing features that may be inaccessible via conventional SIP call control signaling methods, the conferencing system employs an enhanced SIP signaling technique including a conferencing Application Programming Interface (API) that facilitates the interaction between the conferencing application server and the media server in the network signaling plane. The enhanced SIP signaling technique including the conferencing API is implemented by incorporating XML messages, and messages based on the Session Description Protocol (SDP), in the bodies of respective SIP request and response messages. The XML messages are incorporated in the SIP request/response message bodies to convey conference specific commands and/or parameters that cannot be easily described via the SDP.

By incorporating XML payloads into SIP requests/responses to signal the addition of advanced conferencing features, the conferencing system can provide advanced conferencing capabilities without significantly modifying the signal and media flows through the network.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

U.S. Provisional Patent Application No. 60/303,837 filed Jul. 9, 2001 entitled CONFERENCING ARCHITECTURE EMPLOYING MEDIA SERVERS AND ENHANCED SESSION INITIATION PROTOCOL is incorporated herein by reference.

A conferencing system is disclosed that is capable of accessing advanced conferencing features, which cannot be easily accessed via conventional call control signaling methods. The presently disclosed conferencing system accesses such advanced conferencing features via a conferencing application programming interface that allows enhanced call control signaling techniques.

Figure 1:
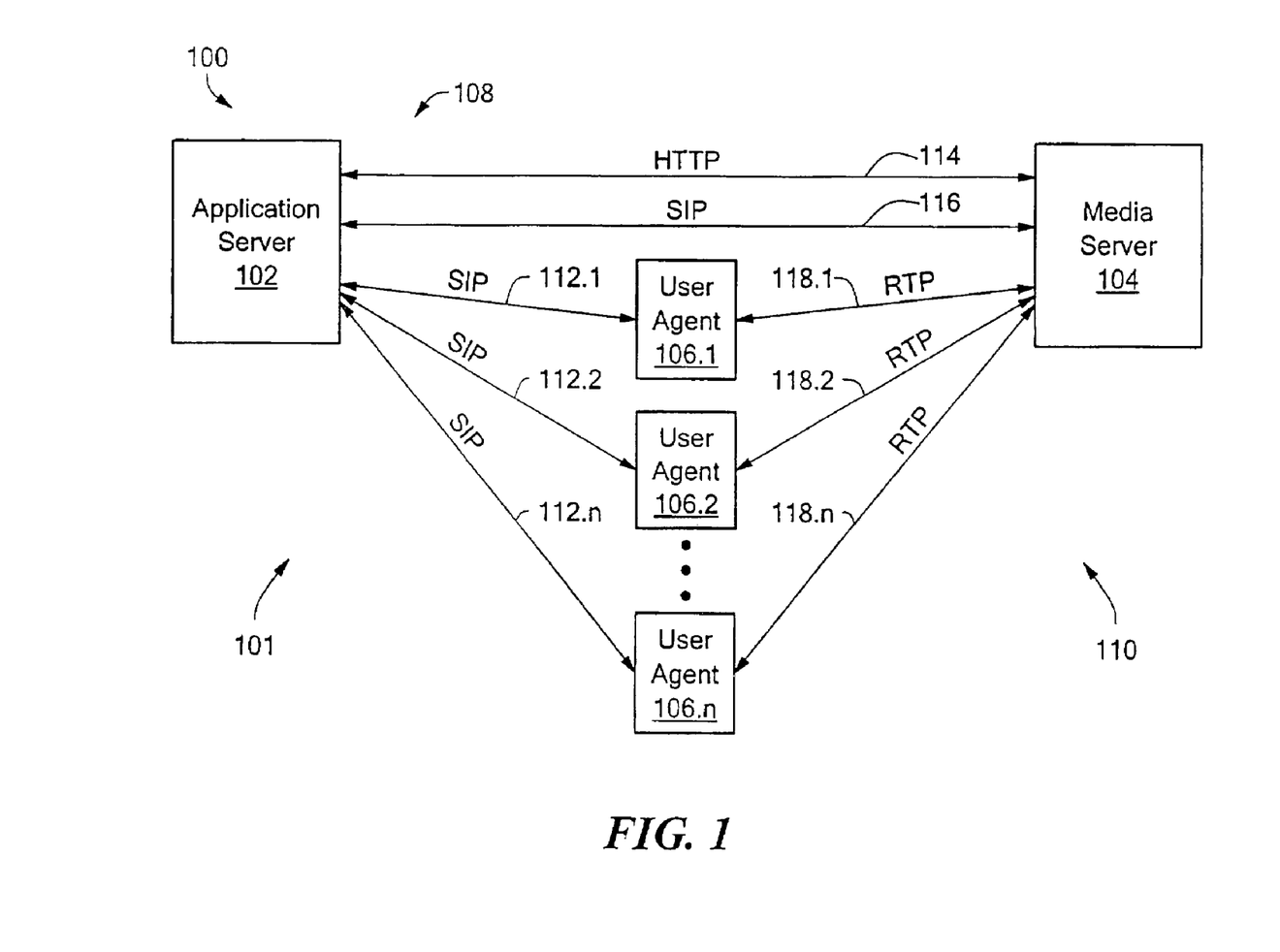
FIG. 1 is a block diagram of a conferencing system capable of accessing advanced conferencing features according to the present invention.

FIG. 1 depicts an illustrative embodiment of a conferencing system 100 capable of accessing advanced conferencing features, in accordance with the present invention. In the illustrated embodiment, the conferencing system 100 comprises a computer network 101 including a signaling plane 108 and a media plane 110. The signaling plane 108 includes signaling control legs 112.1-112.n, 114, and 116, and the media plane 110 includes media conference legs 118.1-118.n. The conferencing system 100 further includes at least one conferencing application server 102, at least one media server 104, and one or more user agents 106.1-106.n. As shown in FIG. 1, the conferencing application server 102, the media server 104, and the user agents 106.1-106.n are connected to respective control legs in the signaling plane 108 of the network, while only the media server 104 and the user agents 106.1-106.n are connected to respective conference legs in the media plane 110 of the network. It is understood that the computer network 101 may comprise a Local Area Network (LAN), a Wide Area Network (WAN), the Internet, or any other network suitable for providing conferencing services.

The conferencing application server 102 is configured to create at least one multimedia session ("conference"), enable prospective conference participants to join the conference, and manage the overall operation of the conference within the conferencing system 100. The media server 104 is configured to provide requested conferencing services to the conference participants, which may comprise one or more of the user agents 106.1-106.n. Each user agent 106.1-106.n is capable of requesting admission to/removal from the conference, and engaging in the multimedia session with the media server 104.

It is understood that the conferencing application server 102, the media server 104, and the user agents 106.1-106.n comprise respective components in the computer network 101 such as server computers, client computers, or software processes running on network nodes. It is further understood that the user agents 106.1-106.n may comprise Internet devices such as SIP phones and/or non-Internet devices such as Public Switched Telephone Network (PSTN) phones. For example, one or more of the user agents 106.1-106.n may comprise a PSTN phone configured to access the conference through a PSTN/Internet Protocol (IP) gateway device.

Moreover, the conferencing application server 102, the media server 104, the user agents 106.1-106.n, and the gateway may comprise respective logical devices, two or more of which may be included in the same physical device. For example, the conferencing application server 102 and one of the user agents 106.1-106.n may comprise respective logical devices included in the same SIP phone or desktop computer (e.g., a WINDOWS XP™ SIP client and a media player). Alternatively, the conferencing application server 102, the media server 104, and the PSTN/IP gateway may comprise respective logical devices included in the same conferencing server device. The conferencing application server 102, the media server 104, and the user agents 106.1-106.n are depicted in FIG. 1 as separate devices for clarity of discussion.

Specifically, the conferencing application server 102 creates one or more conferences and manages the overall operation of the conferences by engaging in call control signaling using a predetermined signaling protocol with one or more of the user agents 106.1-106.n and the media server 104 in the signaling plane 108 of the network 101. In the presently disclosed embodiment, the predetermined signaling protocol is the Session Initiation Protocol (SIP), however, it is understood that any suitable signaling protocol for session initiation may be employed. The Session Initiation Protocol is described in Internet Engineering Task Force (IETF) Request For Comments (RFC) 2543 (1999), which is incorporated herein by reference. As shown in FIG. 1, the conferencing application server 102 engages in SIP signaling with the user agents 106.1-106.n over the respective control legs 112.1-112.n, and with the media server 104 over the control leg 116, in the signaling plane 108. As a result, the media server 104 is conceptually invisible to the user agents 106.1-106.n in the network signaling plane 108.

Further, the media server 104 generates and conveys multimedia data such as audio data over the conference legs 118.1-118.n in the media plane 110 of the network 101 according to the Real Time Transport Protocol (RTP) or any other suitable protocol for transmitting multimedia data. The Real Time Transport Protocol is described in IETF RFC 1889 (1996), which is incorporated herein by reference. In the presently disclosed embodiment, the conferencing application server 102 is not involved in the processing of media flows between the media server 104 and the respective user agents 106.1-106.n in the network media plane 110.

The media server 104 is further configured to provide notice of asynchronous events (e.g., the identification of conference participants whose voices are mixed into the audio output of the conference) over at least one control leg in the signaling plane 108, e.g., the control leg 114, which may comprise a HyperText Transfer Protocol (HTTP) side channel. In alternative embodiments, the media server 104 may employ SIP INFO or NOTIFY signaling methods over a suitable control leg, e.g., the control leg 116, to provide notice of such asynchronous events to the conferencing application server 102.

As described above, the conferencing application server 102 is configured to create one or more multimedia conferences within the conferencing system 100, and enable prospective conference participants to join the conferences. In the presently disclosed embodiment, the conferencing application server 102 employs a SIP INVITE signaling method to create a conference and join prospective participants to the conference, and a SIP BYE signaling method to remove conference participants from the conference.

Figure 2:
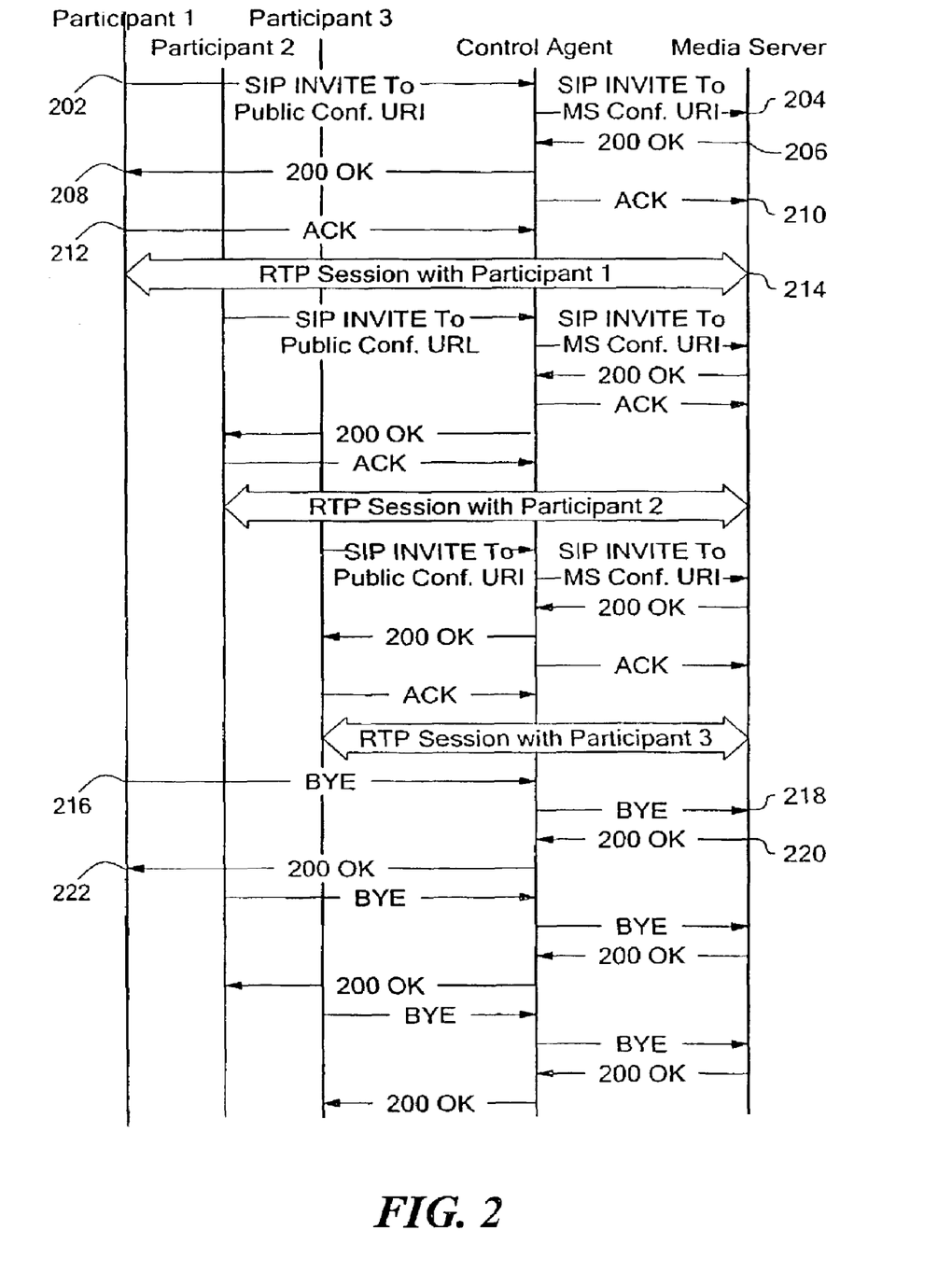
FIG. 2 is a call flow diagram illustrating the creation of a three-way conference using the conferencing system of FIG. 1.

The SIP INVITE/BYE signaling methods employed by the conferencing application server 102 will be better understood with reference to the following first illustrative example and FIG. 2. In this first example, Participant 1 (e.g., the user agent 1.06.1; see FIG. 1) represents a prospective conference participant wishing to join a multimedia conference. To that end, Participant 1 sends a SIP request message 202 (see FIG. 2) to the Control Agent (e.g., the conferencing application server 102; see FIG. 1) over a signaling control leg indicating its desire to join the conference, which is identified by a public conference Universal Resource Identifier (URI). Universal Resource Identifiers are described in IETF RFC 2396 (1998), which is incorporated herein by reference.

For example, the SIP request URI for the desired conference may have the following format:

sip:conf=uniqueIdentifier@mediaserver.carrier.net, in which "conf" indicates to a Media Server (e.g., the media server 104; see FIG. 1) that conferencing services are requested, "uniqueIdentifier" is a suitable value compliant with the URI specification, and "mediaserver.carrier.net" identifies the Media Server. It is noted that it is the responsibility of the conferencing application running on the conferencing application server to ensure that the SIP request URI for the conference is unique so as to avoid potential Universal Resource Identifier conflicts.

After receiving the SIP request message 202, the Control Agent sends a corresponding SIP request message 204 to the Media Server over the signaling control leg. In this illustrative example, the SIP request message 204 is directed to a non-public conference URI identifying the desired conference. In this way, network security is enhanced because the non-public portion of the SIP control interface for the conference is not exposed to Participant 1 or any other prospective conference participant. It is noted that network security can be further enhanced by providing a secure link between the Control Agent and the Media Server to prevent unauthorized entities from creating conferences on the Media Server. For example, security mechanisms that may be employed to provide the secure link between the Control Agent and the Media Server include authenticated SIP, Access Control Lists (ACLs), or any other suitable security mechanism.

In the event the Media Server fails to recognize the conference URI because the URI does not currently exist on the Media Server, the Media Server creates the desired conference according to the Session Initiation Protocol. If the conference URI already exists on the Media Server, then the Media Server sends a SIP 200 OK message 206 to the Control Agent to indicate that Participant 1 has been successfully joined to the conference. The Control Agent then sends a corresponding SIP 200 OK message 208 to Participant 1, and a SIP ACK message 210 to the Media Server to acknowledge its receipt of the SIP 200 OK message 206. Next, Participant 1 sends a SIP ACK message 212 to the Control Agent to acknowledge its receipt of the SIP 200 OK message 208. Because the desired conference has been successfully created and Participant 1 has been successfully joined to the conference, an RTP session 214 is established to allow multimedia data such as audio data to be generated and conveyed between Participant 1 and the Media Server over a suitable media conference leg.

In this illustrative example, if Participant 1 wishes to be removed from the conference, then Participant 1 sends a SIP BYE request message 216 to the Control Agent, which then conveys a SIP BYE request message 218 to the Media Server. Next, the Media Server sends a SIP 200 OK message 220 to the Control Agent, which in turn conveys a SIP 200 OK message 222 to Participant 1 to indicate that Participant 1 has been successfully removed from the conference.

It should be appreciated that the SIP INVITE/BYE signaling methods in the above-described first illustrative example may be employed to manage relatively simple conferencing applications such as applications that use the default conferencing parameters provisioned on the Media Server. For example, a relatively simple conferencing application may comprise a 3-way calling application involving three conference participants (e.g., Participants 1-3 of FIG. 2) with no advanced conferencing features. In such simple conferencing applications, required conference specific commands and/or parameters are typically incorporated in the bodies of SIP request and/or SIP response messages using the Session Description Protocol (SDP).

In order to access advanced conferencing features that are normally inaccessible via conventional SIP call control signaling techniques, the conferencing system 100 (see FIG. 1) employs an enhanced SIP signaling technique including a conferencing Application Programming Interface (API) that facilitates the interaction between the conferencing application server 102 and the media server 104 in the network signaling plane 108. The enhanced SIP signaling technique includes incorporating at least one command in a predetermined payload format in the bodies of SIP request and/or SIP response messages to convey conference specific commands and parameters that cannot be easily described using the SDP. In the presently disclosed embodiment, the predetermined payload format is a form of the Extensible Mark-up Language (XML). It is understood, however, that any suitable form of XML or non-XML language (e.g., a suitable binary representation or text scripting language) may be employed. It is noted that the formal definition of the document structure, i.e., the XML Document Type Definition (DTD), for the XML messages incorporated in the SIP requests/responses is herein referred to as "MediaServerXML". Accordingly, the conference specific commands and/or parameters for achieving enhanced conferencing control are incorporated in the bodies of SIP request/response messages as MediaServerXML payloads.

Specifically, the presently disclosed conferencing API exploits the ability of the Session Initiation Protocol to carry payloads as multi-part MIME message bodies. In the presently disclosed embodiment, the MIME type used to describe the MediaServerXML payloads is "application/xml". Further, each MediaServerXML payload typically comprises a single request or response, and the size of each MediaServerXML payload is approximately equal to that of a typical SDP payload.

As in the first example above, SIP request messages incorporating MediaServerXML payloads are conveyed in the conferencing system 100 from the conferencing application server 102 to the media server 104 via the SIP INVITE signaling method. In the presently disclosed embodiment, each SIP request message carries at least one MediaServerXML payload. Further, in order to simplify the development of the conferencing application and reduce the size of the MediaServerXML payload, one or more of the MediaServerXML request attributes may take on default values or be defined as "#IMPLIED", thereby allowing these attributes to be omitted from the request if they are subsequently not needed.

Moreover, at least one MediaServerXML payload can be carried from the media server 104 back to the conferencing application server 102 in the body of a SIP response message (e.g., a SIP 200 OK message) corresponding to the above-mentioned SIP request message. In the presently disclosed embodiment, MediaServerXML payloads carried by SIP response messages are defined in the XML DTD using a relatively simple and concise form of XML that makes limited use of nesting. This makes the SIP response messages easier to parse, which obviates the need for a full XML parser on the conferencing application server 102.

It is noted that conferencing applications can be configured to subscribe to event notifications using MediaServerXML commands. For example, MediaServerXML commands included in SIP request messages may be employed to specify events of interest (e.g., the identification of conference participants whose voices are mixed into the audio output of the conference) and how notifications of these events are to be performed. Moreover, the event notifications may be delivered via HTTP (e.g., over the control leg 114; see FIG. 1) or using the SIP INFO or SIP NOTIFY signaling methods (e.g., over the control leg 116; see FIG. 1). If the event notifications are delivered via HTTP, the conferencing application may employ a MediaServerXML command to define a Uniform Resource Locator (URL) as the target for the HTTP request (i.e., the "http/get" request, as mentioned below), and the format of the event information. Further, the conferencing application may use the above-described uniqueIdentifier and a SIP Call ID to tie the HTTP event notification to the corresponding conference.

The presently disclosed conferencing API enables enhanced SIP signaling techniques to perform conferencing functions including but not limited to creating a conference, modifying a conference, joining participants to a conference, modifying a conference leg, playing audio, recording audio, and the detection and notification of media events such as DTMF/MF digits. It should be appreciated that these conferencing functions are described below for purposes of illustration.

Creating a Conference

Figure 3:
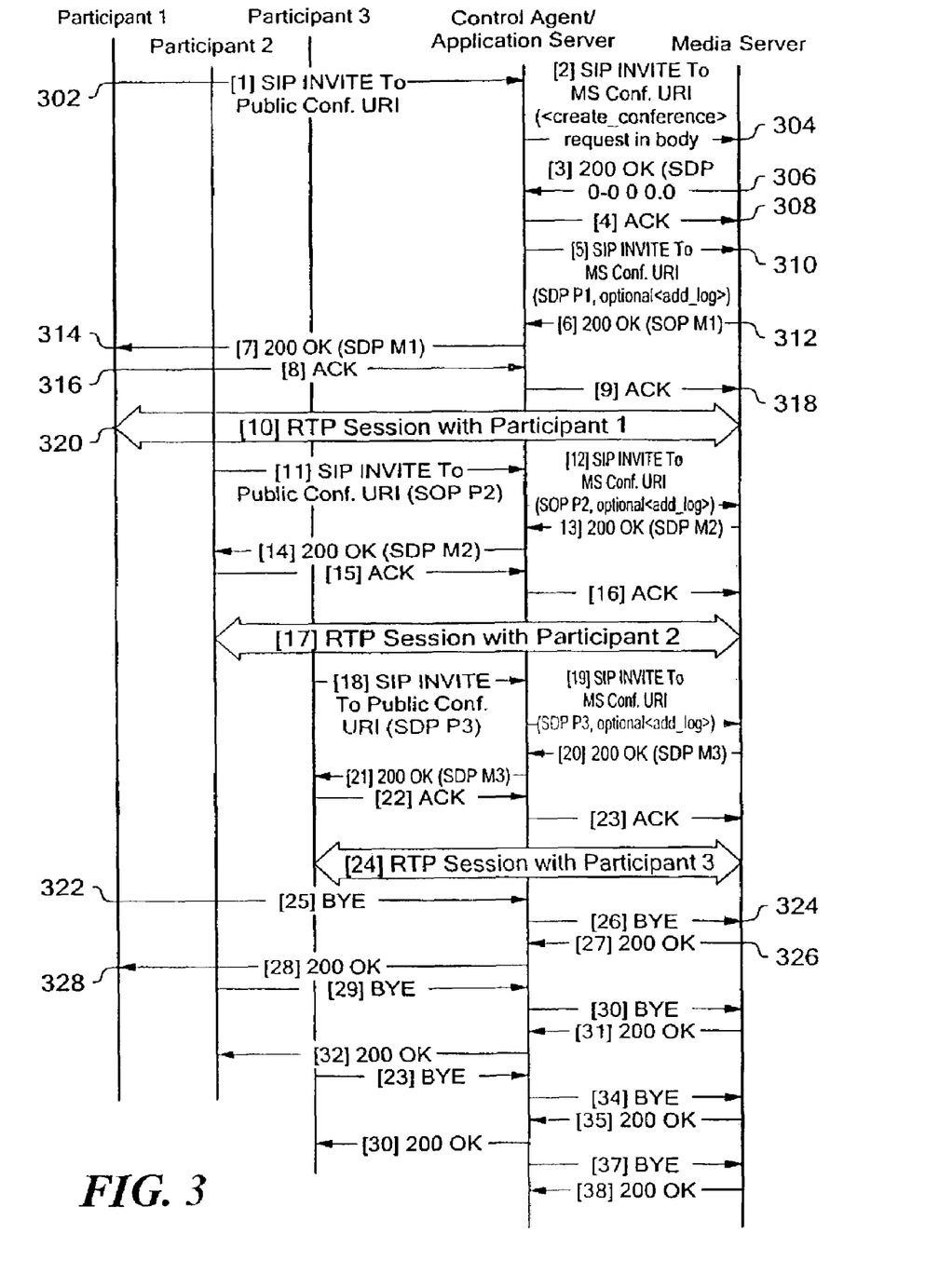
FIG. 3 is a call flow diagram illustrating the creation of a conference having advanced conferencing features using the conferencing system of FIG. 1.

An enhanced SIP signaling technique employed by the conferencing system 100 (see FIG. 1) to create a conference will be better understood with reference to the following second illustrative example and FIG. 3. It is noted that the conference is created using a dedicated control leg that has no associated media flow. This ensures that the conference remains in existence even if one or more of the conference participants leaves the conference.

As shown in FIG. 3, Participant 1 (e.g., the user agent 106.1; see FIG. 1) sends a SIP request message 302 to the Control Agent (e.g., the conferencing application server 102; see FIG. 1) to create the conference. After receiving the SIP request message 302, the Control Agent sends a corresponding SIP request message 304 to a Media Server (e.g., the media server 104; see FIG. 1) over the dedicated control leg (e.g., the signaling control leg 116; see FIG. 1).

In accordance with the presently disclosed conferencing API, the SIP request messages 302 and 304 (see FIG. 3) comprise MediaServerXML payloads including conference specific commands and parameters for creating the desired conference. For example, a MediaServerXML payload including the following XML request message ("<create_conference>") may be employed to request the creation of a conference having up to ten (10) conference participants (or more if sufficient resources are available), and to subscribe to the "join" and "leave" conference events:

```
<?xml version="1.0"?>
<MediaServerXML version="1.0">
    <request>
        <create_conference maxparties="10">
            <subscribe method="http/get"
            target=http://appserver.provder.net/cgi/conf.pl?conf=$
            conf& leg=$leg& event=$event& value=$value>
                <events>
                    <join/>
                    <leave/>
                </events>
            </subscribe>
        </create_conference>
    </request>
</MediaServerXML>.
```

In this second example, the variables $conf, $leg, $event, and $value are expanded to form a URL comprising the target for the http/get request. Specifically, the $conf variable is set to the value of the unique conference identifier specified by the conferencing application in the SIP request URI (i.e., $conf=uniqueIdentifier). This provides a way of associating the conference with event notifications sent on the HTTP side channel. Further, the $leg variable is set to the unique SIP Call ID for the leg on which the event occurred. Moreover, the $event variable describes the type of event that occurred (e.g., the "join" or "leave" conference event). Finally, the $value variable includes the value associated with the event. Because there is no value associated with either one of the "join" or "leave" conference events, the $value variable is empty in this example.

Next, the Media Server sends a SIP 200 OK response message 306 to the Control Agent over the dedicated control leg to indicate that the desired conference has been successfully created. In the presently disclosed embodiment, a SIP response message issued in response to a SIP request message including at least one MediaServerXML payload may also include at least one MediaServerXML payload. For example, the following XML response message may be employed in the SIP 200 OK message 306:

```
<?xml version="1.0"?>
<MediaServerXML version="1.0">
    <response request=create_conference code="200" text="OK" />
</MediaServerXML>,
``` in which "code='200'" indicates that the <create_conference> XML request is successfully completed. The Control Agent then sends a SIP ACK message 308 to the Media Server to acknowledge the receipt of the SIP 200 OK message 306.

In order for Participant 1 to join the existing conference, the Control Agent sends a SIP request message 310 to the Media Server, which sends a SIP 200 OK response message 312 to the Control Agent to indicate that Participant 1 has been successfully joined to the conference. The Control Agent then sends a SIP 200 OK response message 314 to Participant 1. Next, Participant 1 sends a SIP ACK message 316 to the Control Agent, which in turn sends a SIP ACK message 318 to the Media Server, thereby acknowledging the receipt of the SIP 200 OK messages 312 and 314. As a result, an RTP session 320 is established between Participant 1 and the Media Server over a suitable media conference leg.

In the event Participant 1 wishes to leave the conference, SIP BYE request messages 322 and 324 are sent, and SIP 200 OK messages 326 and 328 are generated, as similarly described with reference to the first example above. It should be appreciated that additional conference participants such as Participants 2-3 may be joined to/removed from the conference, in accordance with the call flow depicted in FIG. 3.

Modifying a Conference

In the presently disclosed embodiment, the conferencing application server 102 (see FIG. 1) is capable of modifying an existing conference by sending a SIP "re-INVITE" request message including an XML request message with conference parameters for modifying the conference to the media server 104. For example, the following XML message ("<modify_conference>") may be included in the body of a SIP re-INVITE request message to change the size of an existing conference to 14 conference participants:

```
<?xml version="1.0">
<MediaServerXML version="1.0">
    <request>
        <modify_conference maxparties="14" />
    </request>
</MediaServerXML>.
```

It is noted that the <modify_conference> XML message can be used even if the conference were not created using the above-mentioned <create_conference> XML message. As a result, the conferencing application can modify conference parameters regardless of the initial conferencing requirements.

Moreover, the following illustrative XML message may be included in the body of a SIP response message issued in response to the above SIP request message including the illustrative

```
<modify_conference> XML message:
<?xml version="1.0">
<MediaServerXML version="1.0">
    <response request="modify_conference" code="200" text="OK" />
</MediaServerXML>,
``` in which "code='200'" indicates that the <modify_conference> XML request is successfully completed.

Joining Participants to a Conference

As described above, one or more conference participants may be joined to a conference by directing a suitable SIP request message to the conference URI. In order to provide advanced conferencing features while joining the conference participants, an XML message requesting the advanced conferencing features is included in the body of the SIP request message. For example, the following XML message ("<add_leg>") may be included in the SIP request message body to add a leg to an existing conference:

```
<?xml version="1.0"?>
<MediaServerXML version="1.0">
    <request>
        <add_leg mixmode="parked" toneclamp="no">
            <subscribe method="http/get"
            target=http://appserver.provider.net/cgi/cont.pl?conf=$
            conf& event=$event& value=$value>
                <events>
                    <digits collectmask="6789" numdigits="1"/>
                </events>
            </subscribe>
        </add_leg>
    </request>
</MediaServerXML>.
```

It is noted that the above <add_leg> XML message includes conference parameters for providing advanced mixmode and tone-clamp conferencing features and notification of specific Dual Tone Multi-Frequency (DTMF) events. Further, as described above, the variables $conf, $leg, $event, and $value are expanded to form a URL comprising the target for the http/get request. Moreover, in this XML request message, the $event variable is set to "DTMF", and the $value variable includes a corresponding DTMF digit string.

Modifying a Conference Leg

In the presently disclosed embodiment, the conferencing application server 102 (see FIG. 1) is capable of modifying an existing conference leg (e.g., changing the packet mixing mode or event subscription) by sending a SIP re-INVITE request message including an XML message with conference parameters for modifying the leg to the media server 104. For example, the following XML message ("<modify_leg>") may be included in the body of a SIP re-INVITE request message to change the packet mixing mode:

```
<?xml version="1.0">
<MediaServerXML version="1.0">
    <request>
        <modify_leg mixmode="listen">
        </modify_leg>
    </request>
</MediaServerXML>.
```

For example, the illustrative <modify_leg> XML message above may be used to change the packet mixing mode to "listen" to assure that the multimedia data input of the conference participant on that leg is "muted" and not mixed into the conference.

Playing Audio

In the presently disclosed embodiment, there are at least two SIP call control signaling methods for playing audio within the conferencing system 100 (see FIG. 1). The first call control signaling method requires at least one new or existing conference leg having an associated media flow. The scope of the audio data within the conference is determined by the current mix-mode setting for that conference leg. Specifically, a mix-mode value of "preferred" indicates that the audio input from the conference leg is to be mixed and delivered to all of the conference participants, and a mix-mode value of "parked" indicates that the conference leg's audio Input/Output (I/O) are isolated from the conference. For example, the mix-mode may be set using either the <add_leg> or <modify_leg> XML request message, as described above. It is noted that in order to play audio data to the entire conference, the "virtual" attribute on the conference leg is set to "yes". Finally, a SIP re-INVITE request message including a MediaServerXML payload "<play>" (as described below) is sent to the media server 104.

The "parked" mix-mode is useful when an announcement or an Interactive Voice Response (IVR) script is desired before joining a prospective conference participant to the conference. Specifically, a single SIP request message directs the prospective participant to the conference, but completely isolates the prospective participant from the conference. After the announcement or the IVR script is completed, the conferencing application sends a SIP request message including a <modify_leg> XML message to enable the prospective participant to join the conference. This reduces the amount of SIP signaling between the conferencing application server 102 and the prospective conference participant because there is no need to first "INVITE" the prospective participant to the conference and then re-INVITE the participant to the conference.

The second call control signaling method can be used to play audio to the entire conference. It is noted, however, that the second signaling method requires a conferencing system with a dedicated control leg having no associated media flow. Specifically, the conferencing application sends a SIP re-INVITE request message including the <play> XML message (as described below) to the Media Server over the dedicated control leg. Because there is no media flow associated with the dedicated control leg, it is understood that the audio is to be played to the entire conference.

For example, the following <play> XML message may be included in the body of a SIP request message sent by the conferencing application server 102 to the media server 101 to play audio data within the conferencing system 100 (see FIG. 1):

```
<?xml version="1.0">
<MediaServerXML version="1.0">
    <request>
        <play url=http://audio.provider.net/greeting.g711
        encoding="ulaw" />
        <subscribe method="http/get"
        target="http://appserver.provider. net/cgi/conf.pl?conf=$co
        nf& event=$event& value=$value">
            <events>
                <done/>
            </events>
        </subscribe>
    </request>
</MediaServerXML>.
```

It is noted that the <play> XML message has two attributes, particularly, a first attribute specifying the source URL of the audio data ("url=http://audio.provider.net/greeting.g711") and a second attribute that specifies the encoding of the audio data ("encoding='ulaw'"). Further, in order to receive notification that the audio playing is completed, the <play> XML message subscribes to the "<done>" event, as shown above. In this case, the value of $event is "done", and $value includes a text string describing how the <play> request completed, e.g., End of File (EOF).

Recording Audio

In the presently disclosed embodiment, the SIP call control signaling methods employed to record audio data are similar to the above-described signaling methods used to play audio. For example, the mix-mode for a particular conference leg may be set to "listen", and the virtual attribute on the conference leg may be set to "yes", using either the <add_leg> or <modify_leg> XML request message. Next, a SIP re-INVITE request message including a MediaServerXML payload "<record>" (see below) is sent to the media server 104. For example, the following <record> XML message may be included in the body of a SIP request message sent by the conferencing application server 102 to the media server 104 to record audio data within the conferencing system 100 (see FIG. 1):

```
<?xml version="1.0">
<MediaServerXML version="1.0">
    <request>
        <record url="file:////audio/conf.gsm" encoding="ms_gsm" />
        <subscribe method="http/get"
        target="http://appserver.provider.net/cgi/conf.pl?conf=$co
        nf&event=$event&value$=value">
            <events>
                <done/>
            </events>
        </subscribe>
    </request>
</MediaServerXML>.
```

In alternative embodiments, the conferencing application may issue the <record> XML request message on a dedicated control leg having no associated media flow. Because no media flow is associated with the dedicated control leg, it is understood that the entire conference audio output is to be recorded. It is noted that local URLs using the "file:// . . . " format may be used to identify the location of the source of the recording. Alternatively, the HTTP format may be employed.

In order to receive notification that the audio recording is completed, the conferencing application subscribes to the <done> event, as shown above. In this case, the value of the $event variable is "done", and the value of the $value variable includes text describing how the <record> request completed, e.g., "end_silence" indicating that trailing silence was detected.

It will further be appreciated by those of ordinary skill in the art that modifications to and variations of the above-described conferencing architecture may be made without departing from the inventive concepts disclosed herein. Accordingly, the invention should not be viewed as limited except as by the scope and spirit of the appended claims.

What is claimed is:

1. A system for controlling a conference, comprising:
   a computer network;
   a plurality of user agents;
   a media server operative to establish, in a media plane, said conference, each of said plurality of user agents being, at least at some times, a participant in said conference; and
   an application server communicably coupled to said plurality of user agents via said computer network, said application server being operative to forward, in a signaling plane, at least one first message to said media server via a session based protocol, the forwarded first message including a payload in a markup language format that includes a conference specific command,
   wherein said media server is further operative, in response to receipt of the respective command included in said payload of said forwarded first message, to control said conference as specified in the respective command, and
   wherein said conference specific command is one of:
   a first command operative to request access to said conference;
   a second command operative to request notification of at least one conference event;
   a third command operative to request modification of at least one feature of said conference;
   a fourth command operative to request modification of at least one feature of at least one media conference leg in said media plane;
   a fifth command operative to request addition of at least one media conference leg in said media plane;
   a sixth command operative to request playing of audio data over at least one media conference leg in said media plane; and
   a seventh command operative to request recording of audio data over at least one media conference leg in said media plane.

2. The system of claim 1:
   further including first and second physical devices communicably connected to the network;
   wherein said application server corresponds to a first logical device;
   wherein said plurality of user agents corresponds to a plurality of second logical devices;
   wherein said media server corresponds to a third logical device;
   wherein the first physical device includes the first and second logical devices; and
   wherein the second physical device includes the third logical device.

3. The system of claim 1:
   further including first and second physical devices communicably connected to the network;
   wherein said application server corresponds to a first logical device;
   wherein said plurality of user agents corresponds to a plurality of second logical devices;
   wherein said media server corresponds to a third logical device;
   wherein the first physical device includes the second logical device; and
   wherein the second physical device includes the first and third logical devices.

4. The system of claim 1:
   wherein said application server corresponds to a first logical device;
   wherein said plurality of user agents corresponds to a plurality of second logical devices;
   wherein said media server corresponds to a third logical device;
   wherein the second logical device comprises a logical gateway device; and
   wherein said system further comprises a physical device including the first, second, and third logical devices.

5. The system of claim 1 wherein said application server is operative to forward said conference specific command to said media server over a signaling control leg in said signaling plane to access a conferencing service feature provided by said media server.

6. The system of claim 5 wherein the signaling control leg comprises a dedicated control leg having no associated media.

7. The system of claim 1 wherein said media server is operative to convey multimedia data to said at least one of said plurality of user agents over a media conference leg in said media plane in the event said at least one of said plurality of user agents is provided access to said conference by said application server.

8. The system of claim 1 wherein said media server is operative to convey notification of at least one conference event to said application server over an HTTP side channel in said signaling plane.

9. The system of claim 1 wherein said media server is operative to convey notification of at least one conference event to said application server via a SIP signaling method in said signaling plane.

10. The system of claim 1 wherein said media server is operative to convey notification of at least one media event to said application server over an HTTP side channel in said signaling plane.

11. The system of claim 1 wherein said media server is operative to convey notification of at least one media event to said application server via a SIP signaling method in said signaling plane.

12. The system of claim 1 wherein said media server is operative to convey notification of the at least one event to said application server over a second signaling control leg in said signaling plane by performing call control signaling using said session based protocol.

13. The system of claim 1 wherein said application server is operative to forward the respective command to said media server over a dedicated control leg having no associated media to request the playing of audio data over each media conference leg in said media plane.

14. The system of claim 1 wherein said session based protocol is the Session Initiation Protocol (SIP).

15. The system of claim 1 wherein said markup language format is a form of the Extensible Mark-up Language (XML).

16. The system of claim 1 further including a secure communications link disposed between said application server and said media server.

17. A method of controlling a conference, comprising the steps of:
   establishing, by a media server in a media plane, said conference, each of a plurality of user agents being, at least at some times, a participant in said conference;
   in a forwarding step, forwarding, by an application server in a signaling plane, at least one first message to said media server via a session based protocol, the forwarded first message including a payload in a markup language format that includes a conference specific command; and
   in response to receipt of said conference specific command included in said payload of said forwarded first message, controlling, by said media server, said conference as specified in the respective command,
   wherein said conference specific command is one of:
   a first command operative to request access to said conference;
   a second command operative to request notification of at least one conference event;
   a third command operative to request modification of at least one feature of said conference;
   a fourth command operative to request modification of at least one feature of at least one media conference leg in said media plane;
   a fifth command operative to request addition of at least one media conference leg in said media plane;
   a sixth command operative to request playing of audio data over at least one media conference leg in said media plane; and
   a seventh command operative to request recording of audio data over at least one media conference leg in said media plane.

18. The method of claim 17 further including, in the event the respective user agent is provided access to said conference by said application server, conveying multimedia data to the respective user agent over a media conference leg in said media plane by said media server.

19. The system of claim 1:
   wherein said media server is operative, in response to receipt of said conference specific command, to provide at least one conferencing service to said plurality of user agents;
   wherein the conferencing service has at least one first set of features and at least one second set of features,
   wherein said application server is further operative to forward a first respective command to access one or more of the first set of features of the conferencing service provided by said media server; and
   wherein said application server is further operative to forward a second respective command to access one or more of the second set of features of the conferencing service provided by said media server,
   thereby allowing the first and second sets of features of the conferencing service to be accessed using the same session based protocol.

20. The system of claim 19 wherein said media server is operative to convey, in response to one or more of the first respective command and the second respective command, at least one response message including at least one command in said markup language format.

21. The system of claim 19 wherein said session based protocol is based on the Session Description Protocol (SDP).

22. The systems of claim 20 wherein said markup language format is a form of the Extensible Mark-up Language (XML).

23. The system of claim 1 wherein said application server is further operative:
   to receive, in said signaling plane, at least one second message from one of said plurality of user agents participating in said conference; and
   to forward said at least one first message to said media server via said session based protocol in response to receipt of said at least one second message from said one of said plurality of user agents participating in said conference.

24. The method of claim 17 wherein said forwarding step includes forwarding said conference specific command to said media server over a signaling control leg in said signaling plane to access a conferencing service feature provided by said media server.

25. The method of claim 17
   wherein said modifying of said conference includes providing at least one conferencing service to said plurality of user agents by said media server, the conferencing service having at least one first set of features and at least one second set of features,
   wherein said forwarding step includes forwarding a first respective command to access one or more of the first set of features of the conferencing service provided by said media server, and forwarding a second respective command to access one or more of the second set of features of the conferencing service provided by said media server,
   thereby allowing the first and second sets of features of the conferencing service to be accessed using the same session based protocol.

26. The method of claim 25 further including conveying, by said media server, at least one response message based on said session based protocol to said application server, the response message being conveyed in response to one or more of the first and second respective commands for accessing the one or more of the first and second sets of features of the conferencing service, the response message including at least one command in said markup language format.

27. The method of claim 25 including said forwarding of the first respective command to access one or more of the first set of features of the conferencing service provided by said media server, wherein said session based protocol is based on the Session Description Protocol (SDP).

28. The method of claim 25 including said forwarding of the second respective command to access one or more of the second set of features of the conferencing service provided by said media server, wherein said markup language format is a form of the Extensible Mark-up Language (XML).

29. The method of claim 17:
   further including receiving, by said application server in said signaling plane, at least one second message from one of said plurality of user agents participating in said conference; and
   wherein said forwarding of said at least one first message to said media server includes forwarding said at last one first message to said media server via said session based protocol in
   response to receipt of said at least one second message from said one of said plurality of user agents participating in said conference.

* * * * *

UNITED STATES PATENT AND TRADEMARK OFFICE
CERTIFICATE OF CORRECTION

PATENT NO. : 7,590,692 B2  Page 1 of 1
APPLICATION NO. : 10/191788
DATED : September 15, 2009
INVENTOR(S) : Van Dyke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this

Twenty-first Day of September, 2010

David J. Kappos
*Director of the United States Patent and Trademark Office*